United States Patent
Liu et al.

(10) Patent No.: US 9,891,684 B2
(45) Date of Patent: Feb. 13, 2018

(54) USB TYPE-C DUAL-ROLE POWER PORTS

(71) Applicant: HEWLETT-PACKARD DEVELOPMENT COMPANY, L.P., Houston, TX (US)

(72) Inventors: Tsung-Yi Liu, Taipei (TW); Jeffrey Tan, Tao Yuan (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 30 days.

(21) Appl. No.: 15/092,269

(22) Filed: Apr. 6, 2016

(65) Prior Publication Data
US 2017/0293333 A1    Oct. 12, 2017

(51) Int. Cl.
*G06F 1/32* (2006.01)
*G06F 1/26* (2006.01)
*G06F 13/42* (2006.01)

(52) U.S. Cl.
CPC ............ *G06F 1/266* (2013.01); *G06F 1/32* (2013.01); *G06F 13/4282* (2013.01); *G06F 1/26* (2013.01)

(58) Field of Classification Search
CPC ............... G06F 1/32; G06F 1/26; G06F 1/28
USPC ....... 713/300, 310, 320, 321, 322, 323, 324, 713/325, 375
See application file for complete search history.

(56) References Cited

U.S. PATENT DOCUMENTS

| | | | |
|---|---|---|---|
| 5,938,770 A * | 8/1999 | Kim | G09G 1/005 345/212 |
| 8,749,998 B2 | 6/2014 | Harrison | |
| 8,982,520 B2 | 3/2015 | Predtetchenski et al. | |
| 2010/0165528 A1* | 7/2010 | Chan | H04L 12/40045 361/86 |
| 2014/0125266 A1* | 5/2014 | Huynh | H02M 7/5387 318/400.27 |

OTHER PUBLICATIONS

"Load Switch Basics", Jun. 5, 2015.

* cited by examiner

*Primary Examiner* — Jaweed A Abbaszadeh
*Assistant Examiner* — Keshab Pandey
(74) *Attorney, Agent, or Firm* — HP Inc Patent Department (57) ABSTRACT

Techniques for protecting universal serial bus (USB) Type-C dual-role power ports in computing systems are described. In an example, a first USB Type-C dual-role power port of a computing system is enabled to sink current from a high voltage external device to a power supply of the computing system. The current is transferred through a high voltage path from the first USB Type-C dual-role power port to the power supply. Simultaneously, a high voltage path from the power supply to a second USB Type-C dual-role power port of the computing system is disabled.

15 Claims, 5 Drawing Sheets

USB TYPE-C DUAL-ROLE POWER PORTS

BACKGROUND

Universal Serial Bus (USB) is an industry standard that defines communications protocols to interface not only various computer peripherals, such as keyboards, pointing devices, digital cameras, printers, portable media players, disk drives and network adapters to computing devices, but also various computing devices, such as smartphones, laptops, tablets and video game consoles with each other.

USB standardizes the communications protocols to transfer data as well as power between devices. For example, a mobile phone may be charged via a USB port of a laptop while simultaneously may also be used to exchange data between the mobile phone and the laptop.

BRIEF DESCRIPTION OF FIGURES

The following detailed description references the drawings, wherein.

DETAILED DESCRIPTION

The Universal Serial Bus (USB) Power Delivery (PD) specification defines a protocol, referred to as the USB PD protocol, for exchange of power between computing devices. The PD protocol specifies details, such as architecture, protocols, and power supply behaviour for managing power delivery up to 100 Watts (W) over USB Type-C ports of the computing devices. The USB PD protocol defines a mechanism for paired USB Type-C devices to exchange power delivery capabilities and negotiate power requirements. Accordingly, one of the paired devices acts as a source while the other functions as a sink, and the current and/or voltage that the source may supply to the sink is negotiated between the two paired devices.

Thus, a USB Type-C port of a computing device that supports PD protocol may be a dual-role power port capable of delivering power from a power supply of the computing device to an external device connected at the USB Type-C port and vice versa. Depending on power requirements negotiated between the computing device and the external device, a high or low voltage may be sinked or sourced through the power supply of the computing device via the USB Type-C dual-role power port.

The computing device generally incorporates multiple voltage rails of high and low voltage ratings for transfer of power between the USB Type-C dual-role power port and the power supply. For example, voltage rails of 12V, 15V, 2V, and 5V exist, with the 12V and 15V voltage rails being the high voltage rails while the 2V and 5V voltage rails being the low voltage rails. The voltage rails are further connected with a USB Type-C dual-role power port to establish a conductive path for power transfer between the power supply and the USB Type-C dual-role power port. Accordingly, there are multiple paths for current to flow between the power supply and the USB Type-C dual-role power port. Any one of the high voltage paths or the low voltage paths may be enabled based on the power requirements negotiated between the computing device and the external device.

In computing devices having multiple USB Type-C dual-role power ports, such high and low voltage paths exist between the power supply and each of the multiple USB Type-C dual-role power ports that the computing device may have. In such computing devices, when a high voltage external device is attached to a first USB Type-C dual-role power port and a high voltage path of the first USB Type-C dual-role power port is enabled for transmission of power between the external high voltage device and the power supply, there exists a possibility that the high voltage may appear at a high voltage path of the second USB Type-C dual-role power port. Such instances may occur due to defects, such as firmware malfunctioning in the computing devices. In such scenarios where the high voltage path of the second USB Type-C dual-role power port is enabled due to some malfunction, the high voltage may damage a low voltage external device that may be coupled to the second USB Type-C dual-role power port.

According to an example implementation of the present subject matter, techniques for protecting USB Type-C dual-role power ports of computing systems are described. In an example implementation, in a computing system comprising multiple USB Type-C dual-role power ports, a first USB Type-C dual-role power port may be enabled to sink current from a high voltage external device to a power supply of the computing device. The current is transferred through a high voltage path from the first USB Type-C dual-role power port to the power supply. To protect the other USB Type-C dual-role power ports of the computing system, for example, a second USB Type-C dual-role power port, in an eventuality that the high voltage of the external device appears at the second USB Type-C dual-role power port, the high voltage path from the power supply to the second USB Type-C dual-role power port is disabled simultaneously.

In an example implementation of the present subject matter, a protection device for the USB Type-C dual-role power ports of a computing system is provided. In an example, the protection device comprises a first and a second switch, operable based on inputs of a first USB Type-C power delivery controller that manages the first USB Type-C dual-role power port of the computing system. When the first switch enables the high voltage path between the first USB Type-C dual-role power port and the power supply, the second switch disables the high voltage path between the power supply and the second USB Type-C dual-role power port. Similarly, a third and a fourth switch, operable based on inputs of a second USB Type-C power delivery controller that manages the second USB Type-C dual-role power port, are present in the protection device. Likewise, when the third switch enables the second high voltage path, the fourth switch disables the first high voltage.

Simultaneous disabling of high voltage paths of other USB Type-C dual-role power ports when any one of the USB Type-C dual-role power ports of the computing system is sinking high voltage, protects the USB Type-C dual-role power ports from various types of malfunctioning, such as firmware errors, that may cause high voltage at one of the USB Type-C dual-role power ports to appear at any other USB Type-C dual-role power port. Disabling the other USB Type-C dual-role power ports in turn protects any low voltage external device that may be coupled to these ports.

The above techniques are further described with reference to FIG. 1 to FIG. 5. It should be noted that the description and the Figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
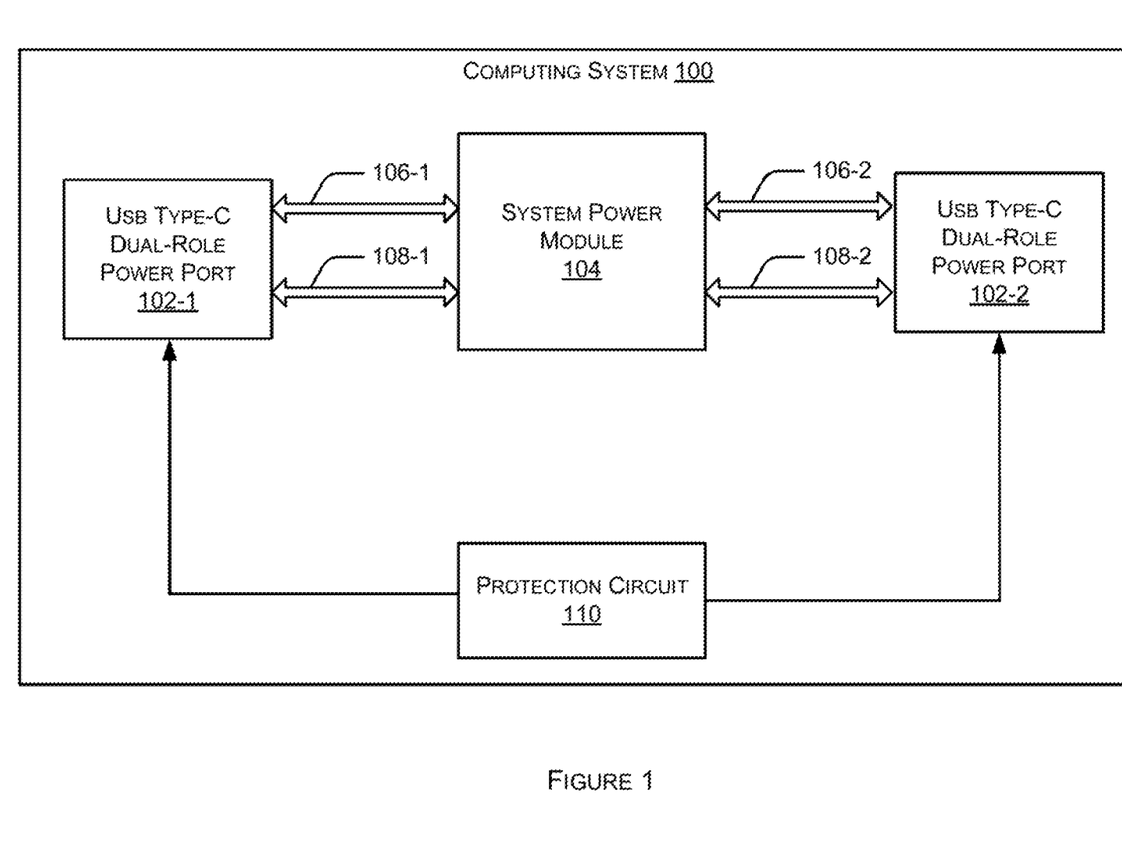
FIG. 1 illustrates a computing system incorporating USB Type-C dual-role power ports, in accordance with an example implementation of the present subject matter.

FIG. 1 illustrates a computing system 100 incorporating USB Type-C dual-role power ports, according to an example implementation of present subject matter. Examples of computing system 100 include devices, such as smartphones, laptops, desktops, personal digital assistant (PDAs), tablets, and other devices such as docking stations that include multiple USB Type-C dual-role power ports. In the example implementation illustrated in FIG. 1, the computing system 100 comprises a first and a second USB Type-C dual-role power ports 102-1 and 102-2, hereinafter referred to as USB ports 102-1 and 102-2, for transfer of data and power between external devices (not shown in figures) and the computing system 100. Examples of external devices include user devices, such as smartphones, laptops, tablets, as well as peripheral devices, such as keyboards, pointing devices, monitors, docking stations, printers and storage devices. Examples of external devices also include devices, such as power adapters that exchange power but not data with the computing system 100.

As mentioned previously, the USB ports 102-1 and 102-2 are dual-role power ports and are capable of transmitting as well as receiving power up to 100 watts. An external device attached to either of the USB ports 102-1 or 102-2 may act as a sink as well as a source for the computing system 100. When the external device is attached with the USB ports 102-1 or 102-2, power delivery capabilities are negotiated between the external device and the computing system 100 to determine the one of them that is to act as the source and the one that is to act as the sink. When the external device attached to the USB ports 102-1 or 102-2 acts as a source for the computing system 100, current flows from the external device to a system power module 104 of the computing system 100. Whereas, when the external device acts as a sink for the computing system 100, the current flows from the system power module 104 to the external device.

In accordance with the USB PD protocol, the USB ports 102-1 and 102-2 are capable of delivering power to or receiving power from external devices based on different predefined power ratings that range from 5V, 2 A to 20V, 5 A. To enable power to be exchanged between the system power module 104 and an external device that may be coupled to any of the USB ports 102-1 and 102-2, voltage paths are provided between the system power module 104 and the respective USB ports 102-1 and 102-2. For each voltage rating defined by the PD protocol, there exist a voltage path for power transfer, and accordingly there are multiple voltage paths between the system power module 104 and each of the USB ports 102-1 and 102-2 to enable transfer of power between the external device and the system power module 104.

There may exist multiple high voltage paths for USB ports 102-1 and 102-2, such as high voltage path for 12V and 15V. Similarly there may exist one or more low voltage paths, such as low voltage path for 2V and 5V. While several voltage paths exist, in the example implementation illustrated in FIG. 1, a first high voltage path 106-1 and a first low voltage 108-1 path are provided between the system power module 104 and the USB ports 102-1. Similarly, a second high voltage path 106-2 and a second low voltage path 108-2 are provided between the system power module 104 and the USB port 102-2. Any one of the multiple voltage paths, corresponding to the power to be exchanged between the system power module 104 and an external device that may be coupled to the USB ports 102-1 or 102-2, may be selectively activated.

Accordingly, when high power is to be transmitted between one of the USB port 102-1 or 102-2 and the system power module 104, the corresponding high voltage path 106-1 or 106-2 of the USB port 102-1 or 102-2 is enabled. Similarly when low power is to be transmitted between the USB port 102-1 or 102-2 and the system power module 104, the corresponding low voltage path 108-1 or 108-2 is enabled. In an example, when a high power external device is attached with the USB port 102-1, the first high voltage path 106-1 is enabled for high power transfer between the external device and the system power module 104. Likewise, if a low power external device is attached to the USB port 102-1, the first low voltage path 108-1 is enabled for low power transfer between the external device and the system power module 104.

In an example, the external device attached to the USB port 102-1 may act as a high voltage, say, 12V source for the computing system 100, while an external device attached to the USB port 102-2 can act as a low voltage, for instance a 5V sink. For external device acting as the high voltage source, the first high voltage path 106-1 of the USB port 102-1 is enabled, while, for the low voltage sink, the second low voltage path 108-2 of the USB port 102-2 is activated. In an eventuality that a malfunctioning of the computing system 100 causes the second high voltage path 106-2 of the USB port 102-2 to get activated, the high power being delivered to the system power module 104 from the high voltage source, may in turn be transferred to the low voltage sink through the second high voltage path 106-2 and may damage the low voltage sink.

To protect USB Type-C dual-role ports from situations that may cause a high voltage applied at one of the USB Type-C dual-role ports to appear across any other USB Type-C dual-role port, in an example implementation of the present subject matter, a protection device 110 is provided. When a high power external device is attached to one of the USB ports 102-1 or 102-2, the protection device 110 enables the high voltage path 106-1 or 106-2 of the corresponding USB port 102-1 or 102-2 and simultaneously disables the high voltage path 106-1 or 106-2 of the other USB port 102-1 or 102-2. Thus, the high voltage at the USB port 102-1 or 102-2 to which the high power external device is attached, does not appear at the other USB port 102-1 or 102-2 thereby preventing damage to any low power external device that may be coupled to the other USB port 102-1 or 102-2. The operation and implementation of the protection device 110 is explained in detail subsequently.

Figure 2:
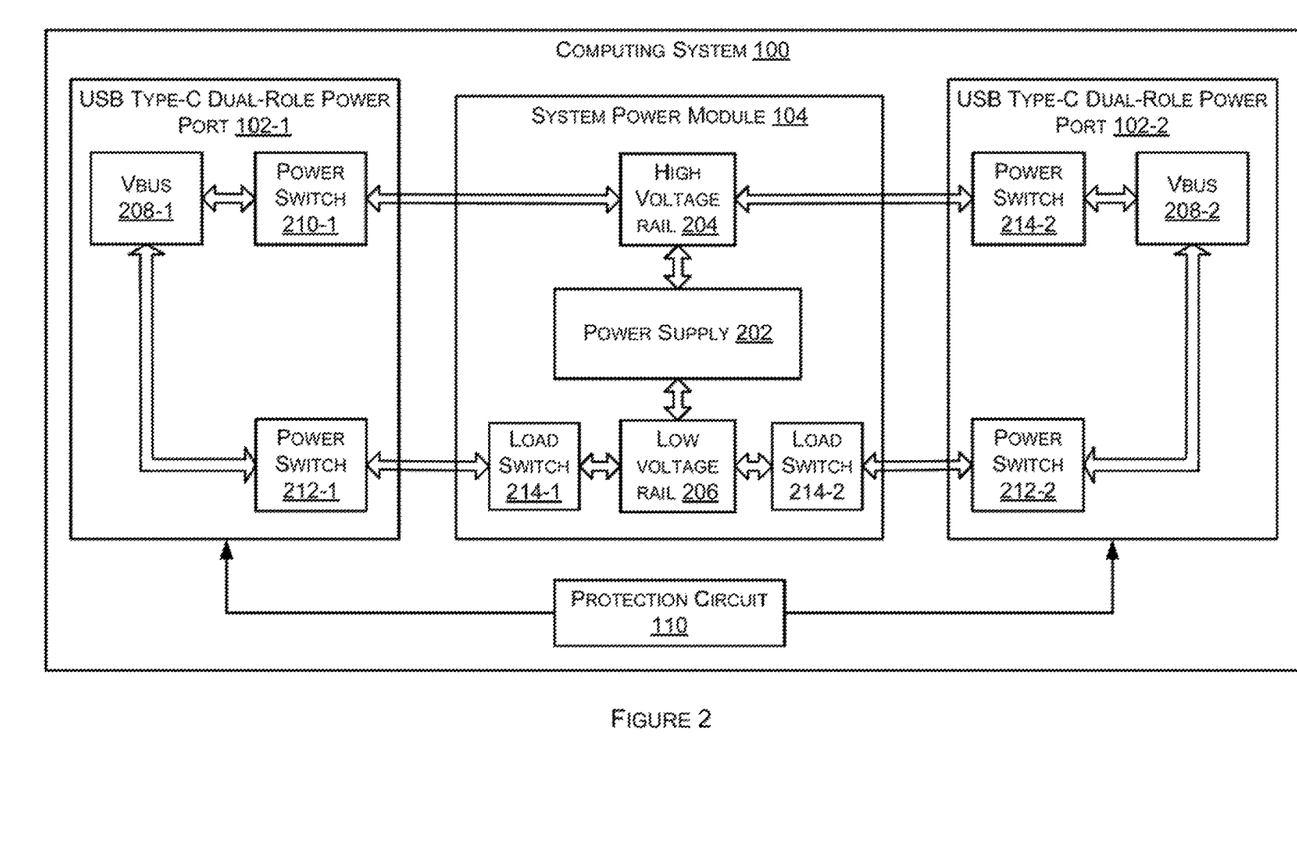
FIG. 2 illustrates a computing system incorporating USB Type-C dual-role power ports, in accordance with another example implementation of the present subject matter.

FIG. 2 illustrates the computing system 100, in accordance with another example implementation of the present subject matter. As depicted in FIG. 2, the system power module 104 comprises power supply 202. The power supply 202 is the source for providing power to various components of the computing system 100. The power supply may also act as a sink for an external high power device coupled to the USB ports 102-1 or 102-2. The power supply 202 includes devices like DC-DC converter, battery pack, or other devices that may provide fixed DC voltages to various components of the computing system 100.

A high voltage rail 204 and a low voltage rail 206 are connected to the power supply 202. A voltage rail is a conductor that serves as a single voltage terminal to provide a connection point to the power supply 202. Multiple wires are connected to the voltage rail to carry current to various components of the computing system 100 and also to carry current to the power supply 202 when the system power module 104 is acting as a sink for the external device connected to a USB port 102-1 or 102-2. The high voltage rail 204 connects to the Vbus 208-1 and 208-2 of the USB ports 102-1 and 102-2, through power switches 210-1 and 210-2, to form the first high voltage path 106-1 and the second high voltage path 106-2, respectively. The low voltage paths 108-1 and 108-2 are formed in a similar manner, with the Vbus 208-1 and 208-2 being coupled to the low voltage rail 206 through power switches 212-1 and 212-2, respectively. While the figure shows a high and a low voltage rail 204, 206, it will be understood that the number of voltage rails corresponds the number of multiple voltage paths implemented between the system power module 104 and the USB ports 102-1 and 102-2.

Needless to mention, the Vbus 208-1 and 208-2 are the pins of the of the respective USB ports 102-1 and 102-2, that connect to a corresponding Vbus of the external device that may be connected at the USB ports 102-1 and 102-2, to provide an electrical connection between the external device and the USB ports 102-1 and 102-2. The power switches 210-1, 210-2, 212-1, and 212-2 are the switches that are selectively turned ON to enable a conducting path between the voltage rail and the corresponding Vbus 208-1 and 208-2 of the USB ports 102-1 and 102-2. Examples of power switches 210-1, 210-2, 212-1, and 212-2 include components like, diodes, metal-oxide-semiconductor field-effect transistor (MOSFET), field-effect transistor (FET), and junction gate field-effect transistor (JFET), alone or in any combination.

When an external device having a high power rating is coupled to the USB port 102-1, the protection device 110 operates to turn ON the power switch 210-1 of the USB port 102-1, thus enabling the high voltage path 106-1 of the USB port 102-1 for high power to be transferred between the external device and the system power module 104. Simultaneously, the protection device 110 also disables the high voltage path 106-2 of the USB port 102-2 by turning OFF the power switch 210-2. This ensures that a low voltage device that may be coupled to the USB port 102-2 is not damaged. The operation of the protection device 110 to control the power switches 210-1 and 210-2 is explained in detail with reference to FIG. 3.

In an example implementation of the present subject matter, load switches 214-1 and 214-2 are inserted between the low voltage rail 206 and the corresponding power switches 212-1 and 212-2 of the USB ports 102-1 and 102-2, respectively. Accordingly, the low voltage path 108-1 and low voltage path 108-2 of the USB ports 102-1 and 102-2 include the load switches 214-1 and 214-2, respectively. The load switches 214-1 and 214-2 are electronic switches that exhibit reverse current blocking characteristics. The load switches 214-1 and 214-2 allow a permitted amount of current to flow from low voltage rail 206 to the respective power switches 212-1 and 212-2 while blocking current beyond a predefined threshold in the reverse direction, i.e., from the power switches 212-1 and 212-2 to the load switches 214-1 and 214-2, respectively. Accordingly, no current greater than the predefined threshold flows in the reverse direction through the load switches 214-1 and 214-2.

Blocking high current in the reverse direction enables the load switches 214-1 and 214-2 to protect the low voltage rail 206 in a situation where high current may flow from a high power external device coupled to the USB port 102-1 or 102-2 through the corresponding power switches 212-1 or 212-2, if they were enabled due to some fault in the computing system 100. Aa an example for understanding the operation of the load switches 214-1 and 214-2, consider that a low power external device is coupled to the USB port 102-1 of the computing system 100 and the corresponding load switch 214-1 as well as the power switch 212-1 are turned ON to enable the corresponding low voltage path 108-1, for example, to supply power to the low power external device. If a high power external device were to be coupled to the USB port 102-1, when the low voltage path 108-1 is active, there exists a possibility that high current due to the high voltage appearing at Vbus 208-1 starts flowing through the power switch 212-1. The load switch 214-1 behaves as an open connection for the high current. This prevents high voltage at Vbus 212-1 from appearing at low voltage rail 206 and thus protects the low voltage rail 206. The load switch 214-2 protects the low voltage rail 206 if a similar situation occurs at USB port 102-2.

In addition to the load switches 214-1 and 214-2 implemented for reverse current protection, the computing system 100 includes the protection device 110 for protection of the USB ports 102-1 and 102-2 from a high voltage at either of the USB ports 102-1 and 102-2 to inadvertently affect a device connected at the other port.

Figure 3:
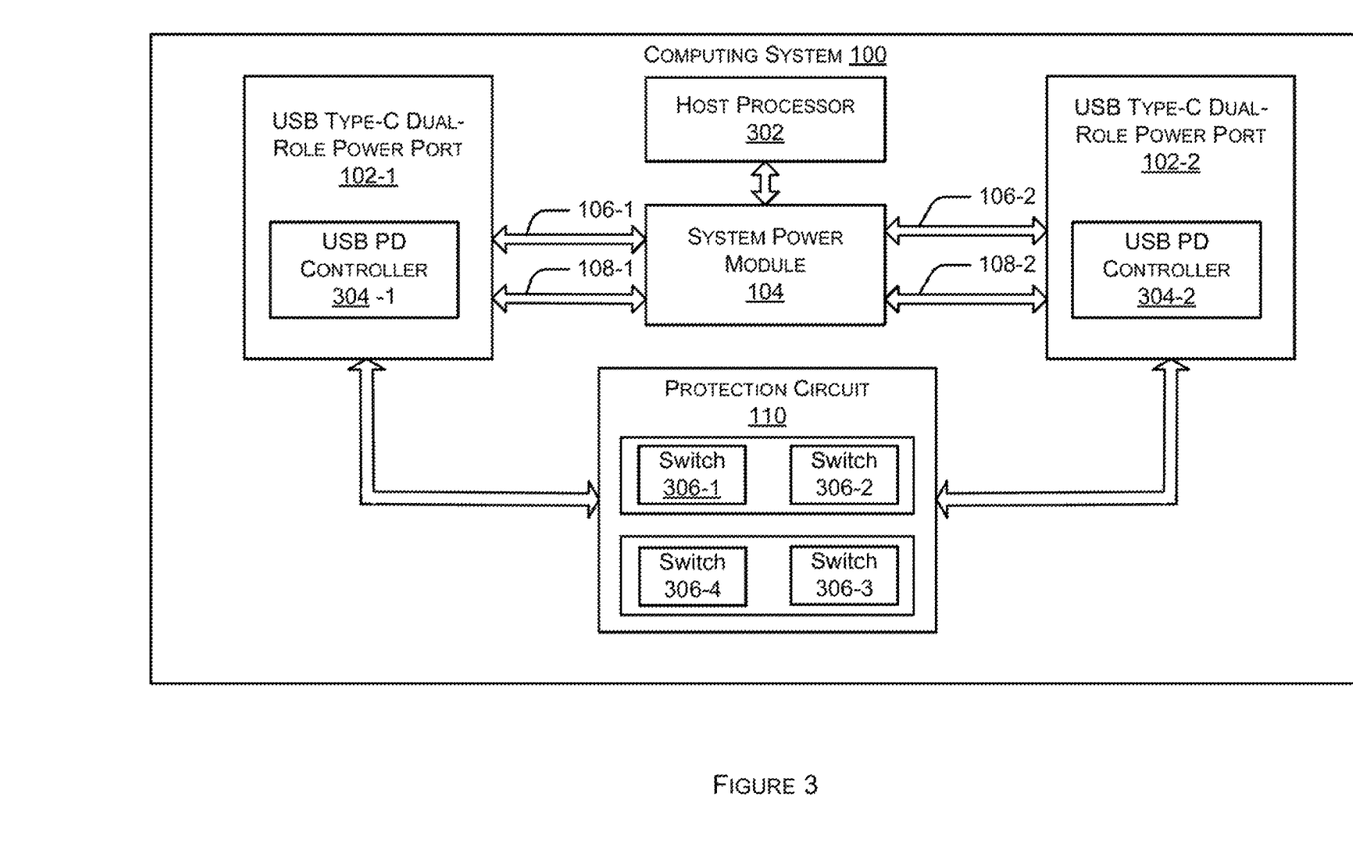
FIG. 3 illustrates a protection device for the USB Type-C dual-role power ports of the computing system, in accordance with an example implementation of the present subject matter.

Reference is made to FIG. 3 that illustrates the protection device 110, in accordance with an example implementation of the present subject matter. In one example, the protection device 110 may operate based on inputs from a host processor 302 of the computing system 100 and USB PD controllers 304-1 and 304-2 of the USB ports 102-1 and 102-2, respectively. The host processor 302 of the computing system 100 is responsible for managing the system power module 104 and various other operations of the computing system 100. The USB PD controllers 304-1 and 304-2 manage the respective USB port 102-1 and 102-2 and are communicatively coupled to the host processor 302. The USB PD controllers 304-1 and 304-2 determine the power delivery of the corresponding USB port 102-1 and 102-2. For example the USB PD controller 304-1 and 304-2 determine if an external device coupled to the USB port 102-1 or 102-2 is to act as a sink or source for the computing system 100.

The functions of the various elements shown in the FIG. 1, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

In an example implementation of the present subject matter, the protection device 110 comprises a first switch 306-1, a second switch 306-2, a third switch 306-3, and a fourth switch 306-4. The first switch 306-1 and the second switch 306-2 operate based on the inputs of the USB PD controller 304-1 and the host processor 302 while the third switch 306-3 and the fourth switch 306-4 operate based on inputs of the USB PD controller 304-2 and the host processor 302.

Figure 4:
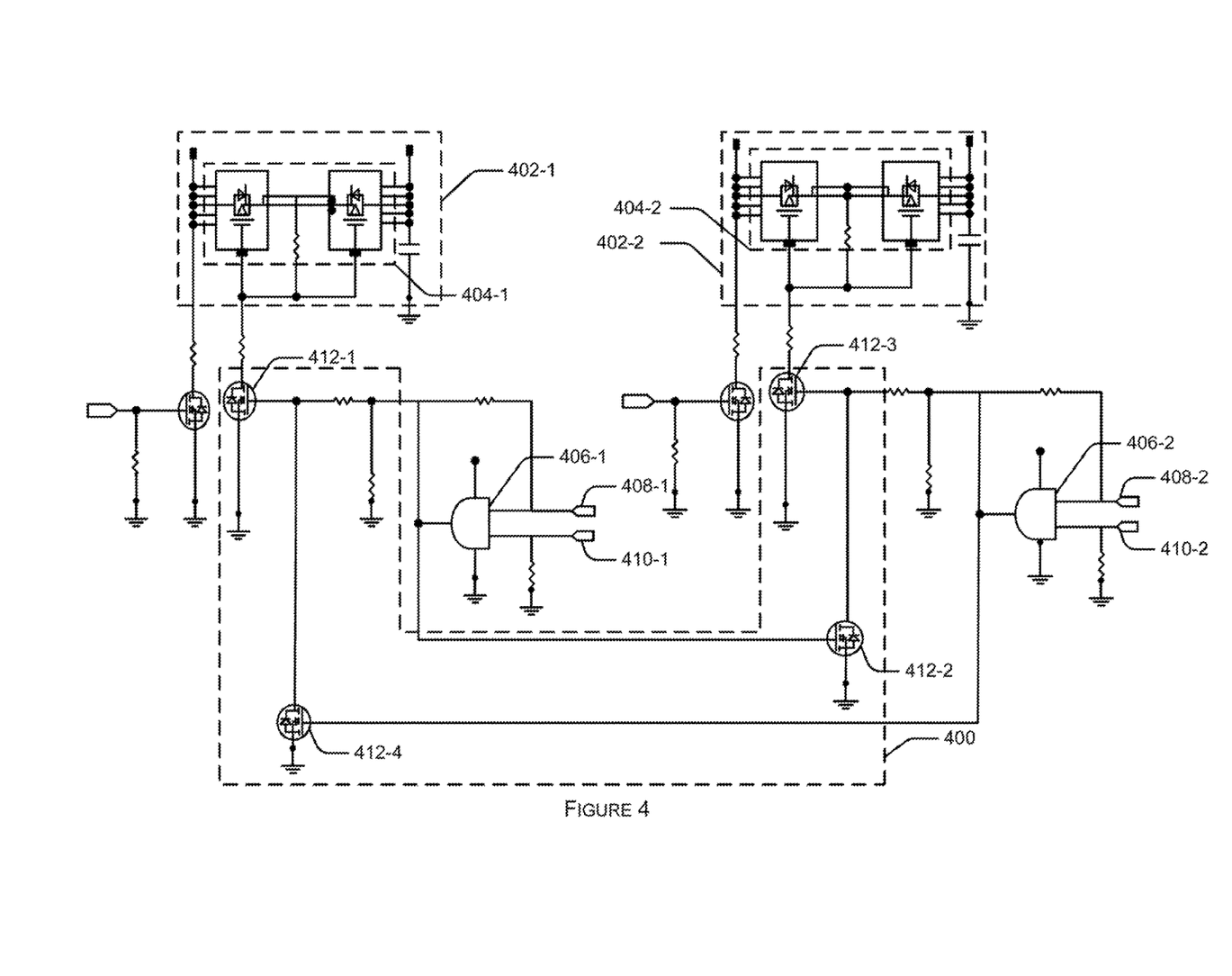
FIG. 4 illustrates the protection device for the USB Type-C dual-role power ports, in accordance with another example implementation of the present subject matter.

In an example implementation of the present subject matter, when a high power external device is coupled to the USB port 102-1, the first switch operates to enable the first high voltage path 106-1 of the USB port 102-1, while, at the same time, the second switch 306-2 of the protection device 110, disables the second high voltage path 106-2 of the USB port 102-2. This ensures that a low power external device, if coupled to the USB port 102-2, is not damaged, in case the high voltage of the USB port 102-1 appears at the USB port 102-2. Similarly, if a high power external device is coupled to the USB port 102-2, the third switch 306-3 operates to enable the second high voltage path 106-2 of the USB port 102-2, and simultaneously the fourth switch 306-4 disables the first high voltage path 106-1 of the USB port 102-1, thereby protecting a low voltage device that may be coupled to the USB port 102-1 of the computing system 100. Reference is made to FIG. 4 for detailed explanation of an example implementation of the protection device 110.

FIG. 4 illustrates a protection device 400 for USB Type-C dual-role power ports of a computing device (not shown in FIG. 4), in accordance with an example implementation of the present subject matter. In the example implementation illustrated in FIG. 4, the protection device 400 is implemented between a first USB port 402-1 and a second USB port 402-2 of the computing device, however, it will be understood that one or more of the protection device 400 may be incorporated between each pair of the USB Type-C dual-role power ports of the computing device.

The USB ports 402-1 and 402-2 have a power switch 404-1 and 404-2 each. In an example, the power switches 404-1 and 404-2 are a combination of P-MOSFETs. The power switches 404-1 and 404-2 are alike the power switches 210-1 and 210-2 that have been explained previously, and operate to enable or disable a first high voltage path and a second high voltage path of the USB port 402-1 and 402-2, respectively. The first and second high voltage path are the conductive path between the corresponding Vbus of the USB port 402-1 and 402-2 and the system power module of the computing device. The first high voltage path and the second high voltage path of the USB port 402-1 and 402-2 are alike the first high voltage path 106-1 and the second high voltage path 106-2 of the computing system 100 described in FIG. 1.

The first USB port 402-1 comprises a logic gate to receive inputs from a host processor (not shown) of the computing device and a USB PD controller (not shown) of the first USB port 402-1. As shown in the figure, in one example, the logic gate may be a AND gate 406-1 that receives a host processor input 408-1 and a USB PD controller input 410-1. The second USB port 402-2 may similarly comprise a AND gate 406-2 that receives a host processor input 408-2 and a USB PD controller input 410-2, the USB PD controller input 410-2 being received from a USB PD controller (not shown) of the second USB port 402-2.

The output of the AND gate 406-1 and the AND gate 406-2 controls the protection device 400. The protection device 400 incorporates a first switch 412-1, second switch 412-2, third switch 412-3, and a fourth switch 412-4. The switches 412-1, 412-2, 412-3, and 412-4 may be a diode, MOSFET, FET, or JFET. The switches 412-1, 412-2, 412-3, and 412-4 are implemented such that the first switch 412-1 and the third switch 412-3 directly control the power switches 404-1 and 404-2, respectively. Thus, when the first switch 412-1 turns ON or is closed, the power switch 404-1 is turned ON and the first high voltage path is enabled for USB port 402-1, and similarly when the third switch 412-3 turns ON, it results in turning ON of the power switch 404-2 thus enabling the second high voltage path of the USB port 402-2. Also, turning OFF or opening of the first switch 412-1 and the third switch 412-3 disables the first and second high voltage path of the USB port 402-1 and 402-2, respectively. The second switch 412-2 and the fourth switch 412-4 operate through the first switch 412-1 and the second switch 412-2, respectively.

Referring to first USB port 402-1, in operation, when the AND gate 406-1 receives the host processor input 408-1 and USB PD controller input 410-1 that are both at a logical HIGH, the output of AND gate 406-1 is a logical HIGH. Such an output of the AND gate 406-1 turns ON a first switch 412-1 of the protection device 400. As the first switch 412-1 turns ON, the power switch 404-1 also turns ON and, in turn, enables the first high voltage path of the USB port 402-1. Simultaneously, the logical HIGH output of the AND gate 406-1 turns ON the second switch 412-2 of the protection device 400, which disables the second high voltage path of the USB port 402-2.

The second switch 412-2 operates in conjunction with the third switch 412-3 of the protection device 400. The second switch 412-2 and the third switch 412-3 are coupled such that the third switch 412-3 turns OFF when the second switch 412-2 is ON. When the logical HIGH output of the AND gate 406-1 turns the second switch 412-2 ON, the third switch 412-3 turns OFF, thus causing the power switch 404-2 to also turns OFF to disable the second high voltage path of the USB port 402-2.

In a similar manner, when the second high voltage path of the USB port 402-2 is active, the protection device 400 disrupts the first high voltage path of the USB port 402-1. Accordingly, when a logical HIGH host processor input 408-2 as well as the USB PD controller input 410-2 is applied at the AND gate 406-2, the logical HIGH output of the AND gate 406-2 turns the third switch 412-3 of the protection device 400 ON. The third switch 412-3 when turned ON enables the second high voltage path of the USB port 402-2 by switching the power switch 404-2 ON. At the same time, the logical HIGH output of the AND gate 406-2 turns the fourth switch 412-4 of the protection device 400 ON and causes the first high voltage path of the USB port 402-1 to get disabled. The fourth switch 412-4 operates in conjunction with the first switch 412-1 to disable the first high voltage path of the USB port 402-1.

The protection device 400 operates to protect a low power external device, coupled to the USB port 402-2, from a high voltage applied at the USB port 402-1, even in situations where an error in the firmware or any component of the computing device causes the inputs 408-2 and 410-2 of the AND gate 406-2 to turn logical HIGH, thereby generating a logical HIGH output at the AND gate 406-2. The logical HIGH output of the AND gate 406-2 has no effect on the third switch 412-3 which remains OFF due to the close state of the second switch 412-2 that drains the current away from the third switch 412-3. With the third switch 412-3 OFF, the power switch 404-2 remains OFF and the second high voltage path remains disabled, protecting the low power device from the high voltage.

Similar operations takes place when a high power external device is coupled to the USB port 402-2. The second high voltage path of the USB port 402-2 is enabled through the third switch 412-3 and the first high voltage path of the USB port 402-1 is disabled by the fourth switch 412-4 operating in conjunction with the first switch 412-1.

Figure 5:
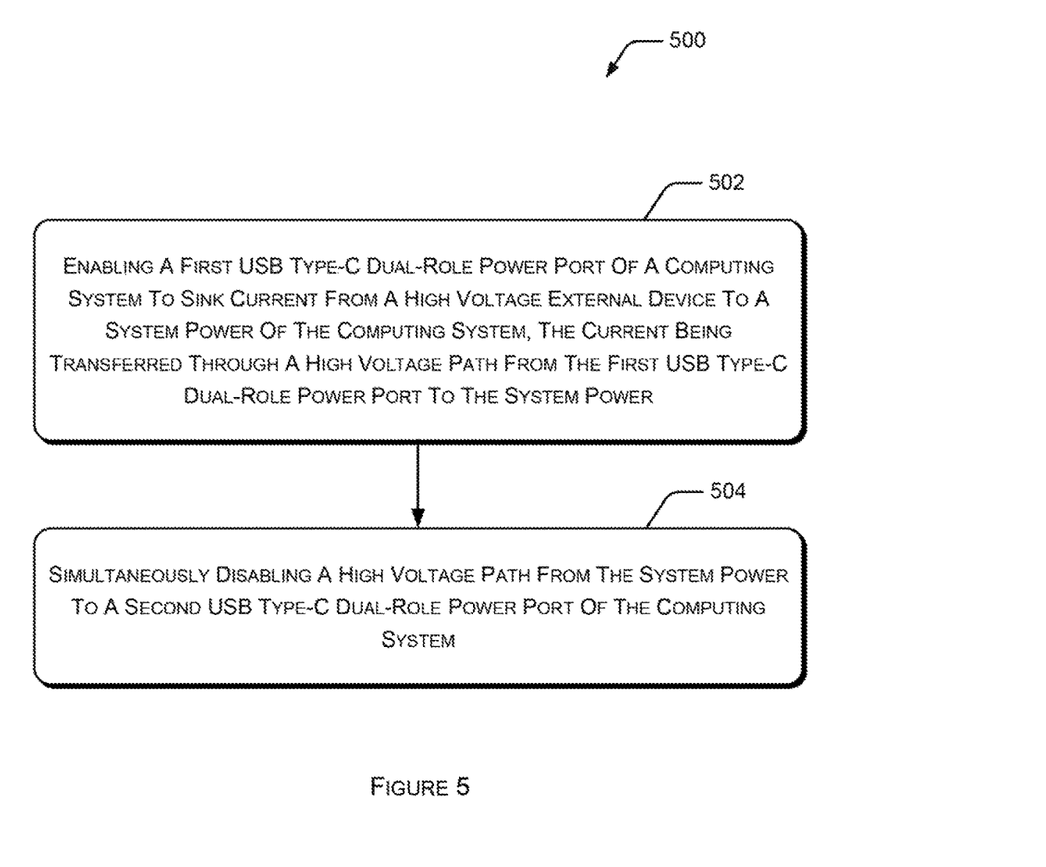
FIG. 5 illustrates a method for protecting USB Type-C dual-role power ports of a computing system, according to an example of the present subject matter.

FIG. 5 illustrates a method for protecting USB Type-C dual-role power ports of a computing system, according to an example of the present subject matter. The order in which the method 500 is described is not intended to be construed as a limitation, and any number of the described method blocks may be combined in any order to implement the method 500, or an alternative method.

It will be understood that the method 500 may be implemented in any computing device that incorporates at least two USB Type-C dual-role power ports. Examples of such computing devices include, mobile devices, laptops, desktops, power adapters, docking stations, plug and play USB devices, and PDAs. For the ease of explanation, the steps of the method 500 are explained in reference to the above-described protection device 110 and 400 that may be implemented in a computing system, such as the computing system 100 for protection of the USB Type-C dual-role power ports.

Referring to FIG. 5, at block 502, for a computing system comprising a first and a second USB Type-C dual-role power ports, the first USB Type-C dual-role power port is enabled to sink current from a high voltage external device to a power supply of the computing system. The current is transferred through a high voltage path from the first USB Type-C dual-role power port to the power supply. In this case, the high voltage external device, coupled to the first USB Type-C dual-role power port, acts as a source for the computing system. To enable the high voltage path of the first USB Type-C dual-role power port, a power switch present in the high voltage path of the first USB Type-C dual-role power port is enabled by a protection circuitry, such as of the protection device 110 or 400 of the computing system.

At block 504, a high voltage path from the power supply to a second USB Type-C dual-role power port of the computing system is disabled. As explained previously, disabling the high voltage path of the second USB Type-C dual-role power port when that of the first USB Type-C dual-role power port is active, protects a low power external device that may be coupled to the second USB Type-C dual-role power port. In an example, for disabling the high voltage path of the second USB Type-C dual-role power port, a power switch present in the high voltage path of the second USB Type-C dual-role power port is disabled by the protection device 400 of the computing system.

The protection device 400 controls the power switches to enable or disable the high voltage path of the first USB Type-C dual-role power port of the computing system. When the high voltage path of the first USB Type-C dual-role power port is enabled, the high voltage path of the second USB Type-C dual-role power port is disabled and vice versa. Thus, when a high power device is coupled to first USB Type-C dual-role power port, the high voltage path of the first USB Type-C dual-role power port is enabled and the high voltage path of the second USB Type-C dual-role power port is disabled. This provides for a protection measure against firmware errors and component defects that may cause high power from the high power device coupled to first USB Type-C dual-role power port to be delivered to a low power device coupled to second USB Type-C dual-role power port.

In an example implementation of the present subject matter, when a high power external device is coupled to the first USB Type-C dual-role power port, the current in a low voltage path of the first USB Type-C dual-role power port is monitored. The low voltage path of the first USB Type-C dual-role power port, such as the previously described first low voltage path 108-1, comprises the power switch of the first USB Type-C dual-role power port coupled with a low voltage rail of the power supply and is implemented to transfer low power between the first USB Type-C dual-role power port and the power supply. If the current in the low voltage path is determined to be higher than a predetermined threshold, a load switch in the low voltage path of the first USB Type-C dual-role power port is activated. The load switch in the low voltage path blocks a reverse current that may flow from the high power device coupled to the first USB Type-C dual-role power port to the power supply.

A similar load switch with reverse current blocking characteristics is implemented in the corresponding low voltage paths of each the USB Type-C dual-role power ports of the computing system. The load switches ensure that the low voltage rail of the power supply is not damaged due to high reverse current in the low voltage paths of any of the USB Type-C dual-role power ports.

Thus, the methods and systems of the present subject matter provide for protecting USB Type-C dual-role power ports of a computing system. Although implementations for protection device for the USB Type-C dual-role power ports have been described in a language specific to structural features and/or methods, it is to be understood that the appended claims are not necessarily limited to the specific features or methods described. Rather, the specific features and methods are disclosed as example implementations for protecting the USB Type-C dual-role power ports.

We claim:

1. A computing system comprising:
 a system power module;
 a first Universal Serial Bus (USB) Type-C dual-role power port comprising a high voltage path and a low voltage path;
 a second USB Type-C dual-role power port comprising a high voltage path and a low voltage path;
  wherein the high voltage path of the first USB Type-C dual-role power port and the high voltage path of the second USB Type-C dual-role power port are to transmit high power between the system power module and the first USB Type-C dual-role power port and the second USB Type-C dual-role power port, respectively, and
  wherein the low voltage path of the first USB Type-C dual-role power port and the low voltage path of the second USB Type-C dual-role power port are to transmit low power between the system power module and the first USB Type-C dual-role power port and the second USB Type-C dual-role power port, respectively; and
 a protection device to enable a high voltage path of the first USB Type-C dual-role power port and to simultaneously disable a high voltage path of the second USB Type-C dual-role power port.

2. The computing system as claimed in claim 1, wherein the system power module comprises:
 a high voltage rail;
 a low voltage rail, the high voltage path of the first USB Type-C dual-role power port and the high voltage path of the second USB Type-C dual-role power port being connected to the high voltage rail and the low voltage path of the first USB Type-C dual-role power port and the low voltage path of the second USB Type-C dual-role power port being connected to the low voltage rail; and a load switch provided between the low voltage rail and the low voltage path of each of the first USB Type-C dual-role power port and the second USB Type-C dual-role power port.

3. The computing system as claimed in claim 1, wherein the first USB Type-C dual-role power port comprises:

a logic gate to receive inputs from a host processor of the computing system and from a USB Type-C power delivery controller that manages the first USB Type-C dual-role power port, and wherein the protection device comprises a first switch and a second switch, such that an output of the logic gate closes the first switch to enable the high voltage path of first USB Type-C dual-role power port and simultaneously closes the second switch to disable the high voltage path of second USB Type-C dual-role power port.

4. The computing system as claimed in claim 3, wherein the high voltage path of the first USB Type-C dual-role power port further comprises a first power switch, the first power switch to turn ON upon closing of the first switch of the protection device to provide a conductive path between the first USB Type-C dual-role power port and the system power module.

5. The computing system as claimed in claim 3, wherein the high voltage path of the second USB Type-C dual-role power port further comprises a second power switch, the second power switch to turn OFF upon closing of the second switch of the protection device to disable a conductive path between the second USB Type-C dual-role power port and the system power module.

6. The computing system as claimed in claim 3, wherein each of the first switch and the second switch is one of a metal-oxide-semiconductor field-effect transistor (MOSFET), field-effect transistor (FET), and junction gate field-effect transistor (JFET).

7. A protection device for USB Type-C dual-role power ports of a computing system, the protection device comprising:

a first switch and a second switch operable based on inputs of a first USB Type-C power delivery controller that manages a first USB Type-C dual-role power port of the computing system, the first switch to enable a first high voltage path between the first USB Type-C dual-role power port and a system power module and the second switch to disable a second high voltage path between the system power module and a second USB Type-C dual-role power port of the computing system; and a third switch and a fourth switch operable based on inputs of a second USB Type-C power delivery controller that manages the second USB Type-C dual-role power port, the third switch to enable the second high voltage path and the fourth switch to disable the first high voltage path.

8. The protection device as claimed in claim 7, wherein the first switch is to operate based on an input from the first USB Type-C power delivery controller and a host controller of the computing system to close a power switch of the first USB Type-C dual-role power port to enable the first high voltage path, and the second switch is to operate based on the input from the first USB Type-C power delivery controller and the host controller to open a power switch of the second USB Type-C dual-role power port to disable the second high voltage path.

9. The protection device as claimed in claim 8, wherein a logical HIGH input from the first USB Type-C power delivery controller and from the host controller is to enable the first high voltage path and disable the second high voltage path simultaneously.

10. The protection device as claimed in claim 8, wherein the second switch is coupled to the third switch, the third switch operating in conjunction with the second switch to disable the second high voltage path.

11. The protection device as claimed in claim 8, wherein a logical HIGH input from the second USB Type-C power delivery controller and from the host controller is to enable the second high voltage path and disable the first high voltage path simultaneously.

12. A method comprising:

enabling a first USB Type-C dual-role power port of a computing system to sink current from a high voltage external device to a power supply of the computing system, the current being transferred through a high voltage path from the first USB Type-C dual-role power port to the power supply; and simultaneously disabling a high voltage path from the power supply to a second USB Type-C dual-role power port of the computing system.

13. The method as claimed in claim 12, wherein the enabling comprises closing a power switch of the high voltage path from the first USB Type-C dual-role power port to the power supply.

14. The method as claimed in claim 12, wherein the disabling comprises opening a power switch of the high voltage path from the power supply to the second USB Type-C dual-role power port.

15. The method as claimed in claim 12 further comprising:

detecting a current greater than a predefined threshold in a low voltage path, the low voltage path provided between the first USB Type-C dual-role power port and the power supply; and activating a load switch to disrupt the current in the low voltage path.

* * * * *

UNITED STATES PATENT AND TRADEMARK OFFICE
CERTIFICATE OF CORRECTION

PATENT NO. : 9,891,684 B2  
APPLICATION NO. : 15/092269  
DATED : February 13, 2018  
INVENTOR(S) : Tsung-Yi Liu et al.

Page 1 of 1

It is certified that error appears in the above-identified patent and that said Letters Patent is hereby corrected as shown below:

On the Title Page

In item (72), Inventors, in Column 1, Line 2, delete "Tao Yuan, TW" and insert -- TaoYuan City, TW --, therefor.

Signed and Sealed this
Tenth Day of July, 2018

Andrei Iancu
*Director of the United States Patent and Trademark Office*